(No Model.)
R. N. ALLEN.
CAR WHEEL.
No. 419,172. Patented Jan. 14, 1890.
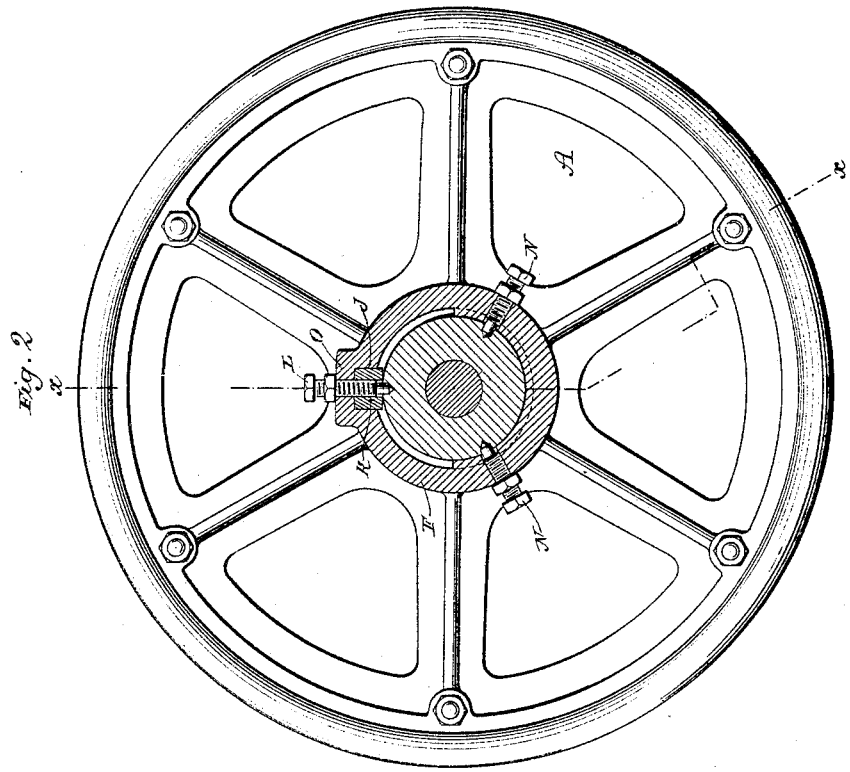
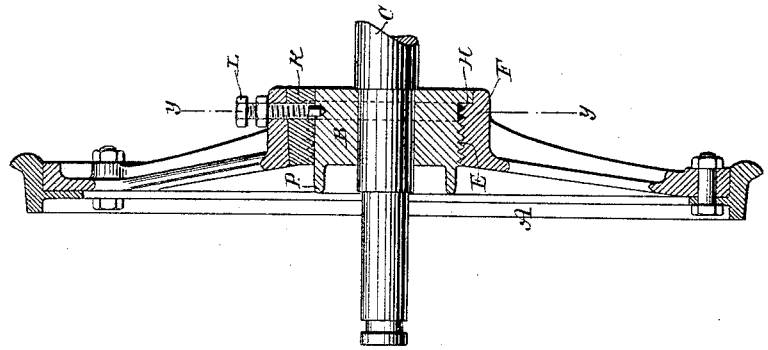
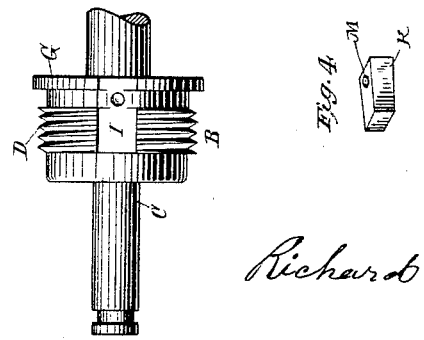
Witnesses:
Raphaël Netter
Ernest Hopkinson
Inventor
Richard N Allen

UNITED STATES PATENT OFFICE.

RICHARD N. ALLEN, OF CLEVELAND, OHIO.

CAR-WHEEL.

SPECIFICATION forming part of Letters Patent No. 419,172, dated January 14, 1890.

Application filed October 11, 1889. Serial No. 326,664. (No model.)

*To all whom it may concern:*

Be it known that I, RICHARD N. ALLEN, of the city of Cleveland, in the county of Cuyahoga and State of Ohio, have invented a new and useful Improvement in Car-Wheels, of which the following is a specification.

The present invention relates to that class of car-wheels which are readily removable from their axles and are particularly adapted for use upon street-cars; and the invention consists, mainly, in the construction and combination of the parts, hereinafter fully described and claimed, by which such wheels are removably secured to their axles.

My invention is illustrated in the accompanying drawings, making a part of this specification, in which—

Figure 1 is a sectional view of a car-wheel containing my invention through the line $xx$ of Fig. 2. Fig. 2 is mainly a view in elevation of the inner side or face of the wheel, the central portion being a section through the line $yy$ of Fig. 1. Fig. 3 is a plan view of the axle and its screw-threaded enlargement with the wheel removed therefrom, and Fig. 4 is a view in perspective of a retaining-key.

In the drawings, A represents a car-wheel of any general shape and construction so far as the body and tire of the wheel are concerned—that is, the body may be spoked, as shown in the drawings, or it may be of continuous metal cast or otherwise made, while the tire may be removable and secured by any suitable means, or it may be integral with the body of the wheel or cast with it.

My present invention relates, especially, to the construction shown in the drawings at the central or hub portion of the wheel, in which B represents a sleeve or enlargement secured to the axle C at the point where the wheel is to be attached. This is preferably made from a piece of metal separate from the axis, and is forced or shrunk upon it, so as to retain its position without turning. It may, however, be of the same piece with the axle, as all that is required is to have it of sufficient diameter and of such construction as to operate in the proper manner with the contiguous parts.

The enlargement B is provided with a screw-thread D, to engage with a corresponding screw-thread E on the interior of hub F. The inner end of B is preferably provided with a flange G, which fits upon a shoulder H in the hub when the parts are screwed home.

I is a slot formed across the screw-thread D and the flange G, and corresponds with a slot J in the interior of the hub F.

K is a key constructed to fill the slot, formed by bringing the slots I and J to register with each other, and it is provided with a hole M to receive a set-screw L, which passes through the key and into a hole in the enlargement B. Other set-screws N N, passing through the hub and entering holes in the enlargement B, may be employed. It is desirable, in order to give the desired strength to the hub at the place where the slot J is cut, to form a boss or enlargement O. The flange P at the outer end of the enlargement B forms a cavity for the inner end of an axle-box, if this construction of box is desired; but this flange may be omitted if other forms of construction of axle-boxes are preferred.

From the above description and the drawings the manner of attaching and removing the wheels from their screw-threaded axles is easily understood, as well as the advantages which attend this mode of construction and combination of parts.

It is true, especially of street-cars, that generally there are no repair-shops within easy reach of the tracks, and that if the wheels of a car of the common construction break down, either by accident or use, (and the wheels are the parts most liable to fail or be broken,) the wheels of the car as well as the axle must be removed and taken to a shop, where the wheels must be removed from the axles and new wheels substituted at considerable trouble and expense and loss of the use of the car.

By means of the construction herein set forth it is easy even for unskilled workmen to remove broken or worn wheels and substitute new ones, and to do the work on the line of the road and without other tools than those usually carried upon the cars. All that is necessary to accomplish this is to detach the wheels and axles from the car, loosen the set-screws, remove the retaining-key, take hold of the wheel and unscrew it from its axle, and then apply a new wheel by reversing the order of the steps just named. Of course it will be understood that to make the use of these wheels most efficient the separable parts should be made interchangeable—that is, the screw-threaded part of all the axles should be of the same size and pitch of screw, and should fit the corresponding screw-thread in the hub, so that any wheel will fit readily and perfectly upon any axle. It is observed that this screw-threaded union as a means of securing car wheels and axles together has the great advantage of giving a firm and stable attachment between these parts, affording a tight and broad bearing which prevents lateral play or rocking motion and the consequent wear of the parts.

What is claimed as new is—

1. A car-wheel axle provided with a screw-threaded sleeve or enlargement constructed to be screwed into a corresponding screw-threaded aperture in the center of a car-wheel, substantially as and for the purpose set forth.

2. The combination, with a screw-threaded axle and a screw-threaded hub of a car-wheel, of set-screws passing through the hub and into the axle, substantially as and for the purpose set forth.

3. The combination, with a screw-threaded axle and a screw-threaded hub of a car-wheel, of a retaining-key K and a set-screw L, substantially as and for the purpose set forth.

RICHARD N. ALLEN.

Witnesses:
ROBT. H. DUNCAN,
PARKER W. PAGE.